United States Patent [19]
Palumbo

[11] 3,970,399
[45] July 20, 1976

[54] FASTENER ASSEMBLY AND FASTENER THEREOF

[75] Inventor: Nunzio J. Palumbo, Erie, Pa.

[73] Assignee: Louis Marx & Co., Inc., Glen Dale, W. Va.

[22] Filed: Feb. 10, 1975

[21] Appl. No.: 548,721

[52] U.S. Cl. .................................. 403/231; 46/31; 52/754
[51] Int. Cl.² ........................................ A47B 23/00
[58] Field of Search ............ 52/285, 582, 756, 757, 52/754, 753 C, 753 D; 85/80; 46/31; 151/41.75, 41.76; 403/231, 196; 248/239

[56] References Cited
UNITED STATES PATENTS

| | | | |
|---|---|---|---|
| 680,523 | 8/1901 | Ganter | 52/285 |
| 1,398,071 | 11/1921 | Forester | 248/239 X |
| 3,110,338 | 11/1963 | Rapata | 151/41.75 |
| 3,759,191 | 9/1973 | Freeman | 248/239 X |

*Primary Examiner*—Andrew V. Kundrat
*Attorney, Agent, or Firm*—Blum, Moscovitz, Friedman & Kaplan

[57] ABSTRACT

A fastener assembly for securing a pair of contiguous standards at substantially right-angles relative to each other is provided which includes a fastener comprising first and second perpendicularly oriented webs, and means mounted on the second web for connecting a standard thereto; and including a first standard having a configured through slot, the second web being introduced through the slot until the first web abuts the first standard; and a second standard abutting the second web and being contiguous with the first standard.

1 Claim, 7 Drawing Figures

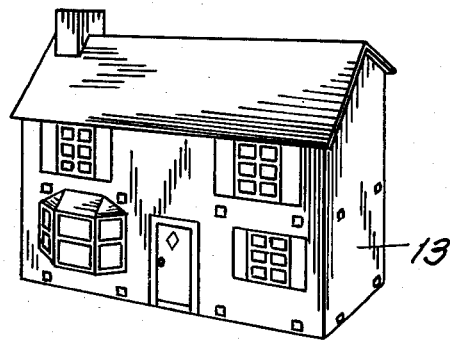
FIG. 1
FIG. 2
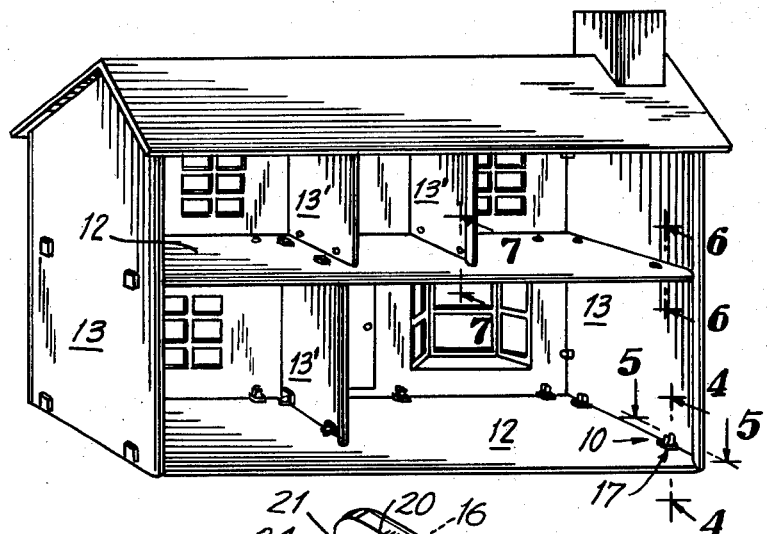
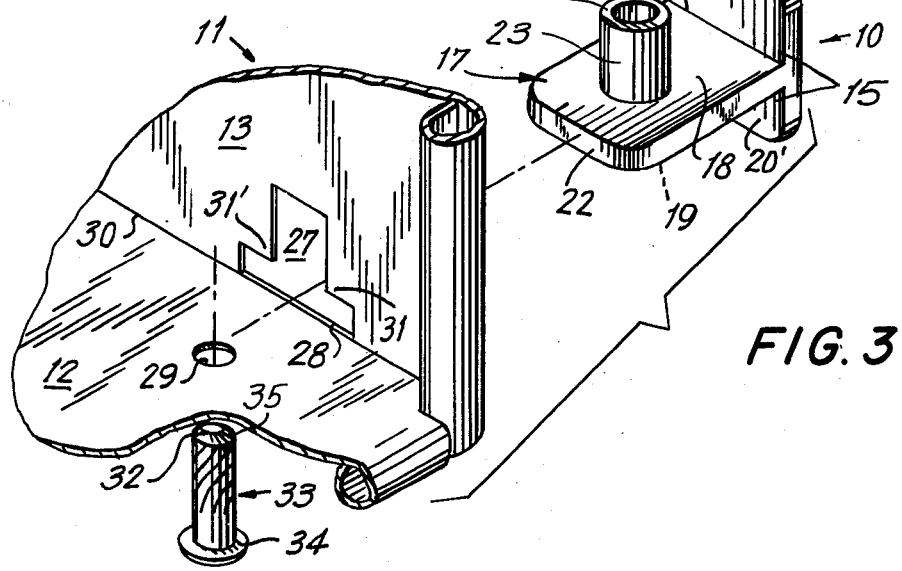
FIG. 3

FASTENER ASSEMBLY AND FASTENER THEREOF

BACKGROUND OF THE INVENTION

The instant invention relates to an assembly and fastener for a safety oriented toy construction. More particularly, the present invention relates to a fastener and assembly for erecting interior and exterior panels of a toy construction, for instance a doll house.

Prior to the adoption of safety guidelines for toy manufacturers, toy housings usually included slot and tab arrangements for assembly thereof. For instance, sheet metal doll houses included panels having bendable tabs and panels having corresponding slots registerable therewith. Under the industry guidelines, this type of construction was found unsafe for the young children who were the predominant users thereof.

An alternative construction which conformed to the requisite standard of safety, included replacing the tab and slot arrangement with a nut and bolt arrangement. The nut and bolt assembly method, however, increases the amount of time required to assemble the toy, as well as the cost thereof.

Accordingly, there is a need for a safe, economical fastener assembly and fastener which may be employed with facility to erect panels of a toy housing.

SUMMARY OF THE INVENTION

Generally speaking, in accordance with the invention, a fastener assembly for securing a pair of contiguous standards at substantially right-angles relative to each other is provided. The assembly includes a fastener comprising first and second perpendicularly oriented webs, and means mounted on the second web for connecting a standard thereto. One of the standards is provided with a configured through slot and the second web of the fastener may be introduced through the slot until the first web thereof abuts the standard. The other standard abuts the second web and is contiguously arranged relative to the first standard.

The first web of the fastener has an outer and an inner face, and the inner face thereof abuts against the standard. The second web comprises a cantilever perpendicularly mounted on the inner face of the first web. The cantilever is provided with an upper surface and a lower surface, and has a through-hole proximate the free end thereof. In the assembly, the lower surface of the cantilever abuts against the other standard.

In a preferred embodiment of the invention, the means mounted on the second web or cantilever for connecting the other standard thereto comprises a collar upstanding on the upper surface of the cantilever. The collar includes a socket opening towards the lower surface of the cantilever which is registered with the through-hole provided in the cantilever. The other standard is, for instance, provided with an aperture therein respectively registerable with the through-hole provided in the cantilever and the socket formed in the collar mounted thereon. The free end of a stud having a capped end may be introduced into the registered apertures respectively in the other standard and cantilever, and mounted into the socket registered therewith, for thereby connecting the other standard to the second web or cantilever of the fastener.

In this preferred embodiment, the configured slot provided in the standard against which the first web abuts has a T-shape for the purpose of accommodating the laterally extending second web and collar upstanding thereon.

Accordingly, it is an object of this invention to provide a fastener assembly and fastener therefor, which, respectively, meet approved industry safety guidelines.

Another object of the invention is to provide a fastener assembly and fastener therefor which are easily secured for erecting panels of a toy construction.

A further object of the invention is to provide a fastener having integrally molded webs for erecting panels of a toy construction at substantially right-angles relative to each other.

Still another object of the invention is to provide a fastener assembly which requires minimum dexterity to employ.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an isometric view of a doll house erected with a plurality of fastener assemblies constructed in accordance with the invention;

FIG. 2 is a side elevational view of the doll house, as seen in FIG. 1;

FIG. 3 is an exploded view of a fastener assembly constructed in accordance with the instant invention and employed to erect the doll house, as seen in FIG. 2;

DESCRIPTION OF THE PREFERRED EMBODIMENT

Figure 4:
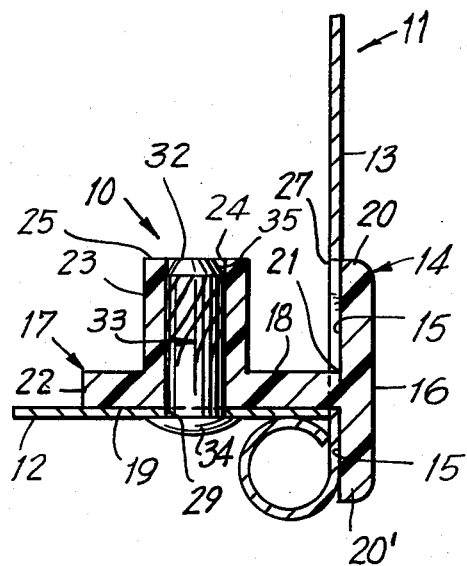
FIG. 4 is a sectional view taken along line 4—4 of FIG. 2.

Referring now to the Figures, a fastener generally designated by the numeral 10 is employed in a panel assembly generally designated by the numeral 11 for releasably interlocking panels 12 and 13 substantially perpendicularly relative to each other. As best seen in FIG. 3, fastener 10 includes a longitudinally extending web 14 having an inner face 15 and an outer face 16. Intermediately connected to inner face 15 of web 14 is a laterally extending web 17 having an upper surface 18 and a lower surface 19.

The fixed connection of web 17 to the inner face 15 of web 14 substantially defines a pair of lug sills 20, 20' in web 14. Web 17 has an end 21 fixedly connected to inner face 15 of web 14 and a free end 22. As may be seen with reference to FIG. 3, web 17 is a cantilever type structure. Mounted on upper surface 18 of web 17 is an annular collar 23 having an interiorly defined annulus 24 comprising a socket which at least opens towards the lower surface 18 of web or cantilever 17. While in the preferred embodiment illustrated in the Figures, annulus 24 is shown as a through-channel in collar 23, in practice, free end 25 of collar 23 may be closed and it is only necessary that annulus 24 open downwardly into upper surface 18 of cantilever 17.

Figure 6:
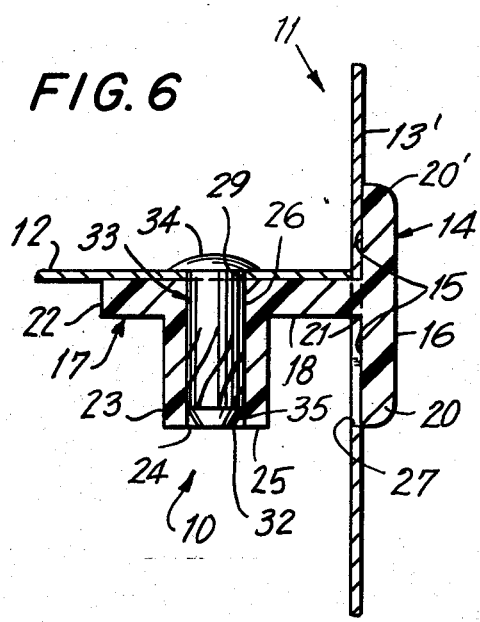
FIG. 6 is a sectional view taken along line 6—6 of FIG. 2.
Figure 5:
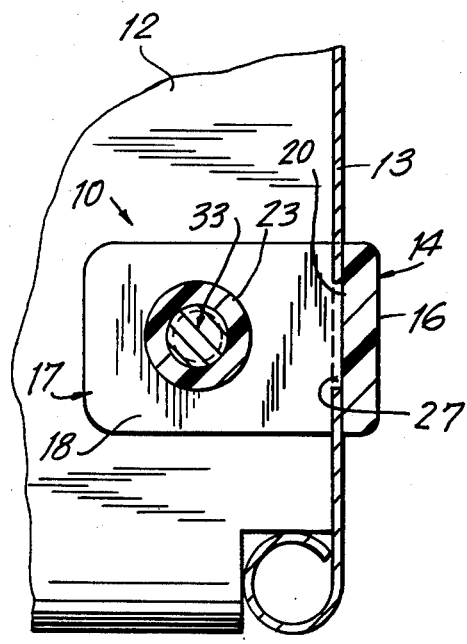
FIG. 5 is a sectional view taken along line 5—5 of FIG. 2.
Figure 7:
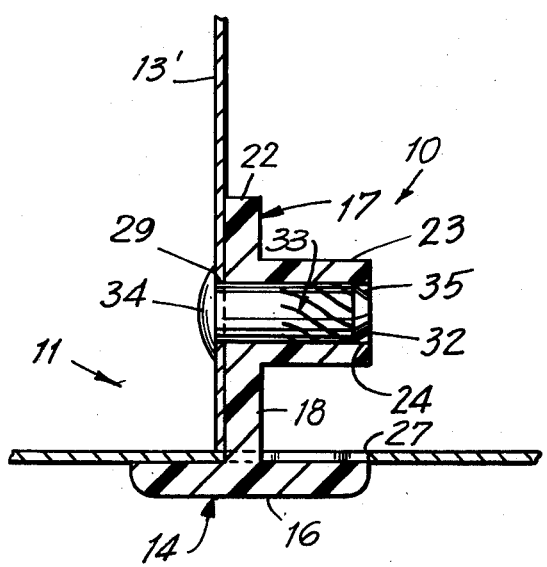
FIG. 7 is a sectional view taken along line 7—7 of FIG. 2.

As best seen in FIGS. 4 – 7, an aperture 26 is provided in cantilever 17 which is registered with annulus 24 provided in collar 23. Installation of fastener 10 between assembled panels 12 and 13 may be seen with reference to FIG. 3. The installed fastener and assembled panels may, however, be best seen in FIGS. 4 – 7. Reference may be had to FIGS. 1 and 2 for the purpose of showing a structure, namely a doll house, erected with a plurality of fasteners 10 and a plurality of assembled panels 12 and 13.

Referring again to FIG. 3, panel 13 which comprises a vertically arranged standard is provided with a slot 27 having a T-shape. Slot 27 is T-shaped to accommodate introduction of cantilever 17 and collar 23 mounted thereon therethrough. A pair of opposed elbows 31, 31' in panel 13 define an access and egress route for cantilever 17 through slot 27. Concomitantly, upward extensions thereof define the access and egress route for collar 23 through slot 27.

At the base 28 of slot 27, panel 12 which is a horizontally arranged standard is contiguous to panel 13. In panel 12, an aperture 29 is provided a predetermined distance from transverse edge 30 in correspondence with aperture 26 in cantilever 18 and annulus 24 provided in collar 23. In the assembled fastener system, aperture 26 is respectively registered with aperture 26 and annulus 24.

To assemble the fastener system, cantilever 17 and collar 23 are introduced through slot 27 until lug sills 20, 20' of web 14 abut panel 13, and an aperture 26 in cantilever 17 is registered with aperture 29 in panel 12. Dimensions of slot 27 are predetermined so that web 14 does not pass therethrough. To secure panels 12 and 13, the free end 32 of a capped stud 33 may be introduced upwardly through registered apertures 26 and 29 and into annulus 24 of collar 23 until cap 34 thereof abuts panel 12. Stud 33 may, for instance, be self-tapping and free end 32 thereof may have a continuous beveled edge 35 to reduce entry friction into annulus 24 of collar 23 which provides a secure fit.

As seen with reference to FIG. 2, panels 12 and 13 correspond respectively to the horizontal and vertical standards of the erected doll house in which the fastener system is employed. A plurality of dividers 13' are also employed to compartmentalize the interior of the construction. It may be observed in FIGS. 1 and 2 that a plurality of fasteners 10 are spaced according to a predetermined pattern in the construction to provide secure interlocks among oriented panels.

Versatility of the installation of the fastener assembly is best seen with reference to FIGS. 2 and 4 – 6. Fastener 10 may be mounted between panels along any 90° quadrant line as it is rotated through a circle. Therefore, while cantilever 17 has been described as having an upper and lower surface, that usage is merely relative to the position of collar 23 thereon and for descriptive purposes.

Fastener 10 may be fabricated of a variety of suitable materials. For instance, fastener 10 may be an integrally molded plastic piece. The assembly panels in which fastener 10 is employed may similarly be fabricated of a variety of materials, for instance sheet metal. When sheet metal panels are employed slots 27 and apertures 29 may be stamped therein.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A fastener assembly for securing a pair of contiguous standards at substantially right-angles relative to each other including a fastener comprising first and second perpendicularly oriented webs, and means mounted on the second web for connecting a standard thereto; and including a first standard having a configured through slot, the second web being introduced through the slot until the first web abuts the first standard; and a second standard abutting the second web and being contiguous with the first standard, the first web having an outer and an inner face, and the second web comprising a cantilever perpendicularly mounted on the inner face of the first web, the cantilever having an upper surface and a lower surface, and a through-hole proximate its free end, the second standard abutting the lower surface of the cantilever, the means mounted on the second web for connecting the second standard thereto comprising a collar upstanding on the upper surface of the cantilever, and the collar including a socket opening towards the lower surface of the cantilever which is registered with the through-hole provided in the cantilever, the second standard having an aperture therein respectively registerable with the through-hole provided in the cantilever and the socket formed in the collar mounted thereon, and a stud having a capped end and a free end, the free end thereof being introducible into the registered apertures respectively in the second standard and cantilever, and into the socket registered therewith, for thereby connecting the second standard to the second web of the fastener, the configured slot provided in the first standard having a T-shape.

* * * * *